(12) United States Patent
Cheng

(10) Patent No.: US 10,634,946 B2
(45) Date of Patent: Apr. 28, 2020

(54) REFLECTIVE LIQUID CRYSTAL PANEL AND DISPLAY DEVICE

(71) Applicant: Wuhan China Star Optoelectronics Technology Co., Ltd., Wuhan, Hubei (CN)

(72) Inventor: Yan Cheng, Hubei (CN)

(73) Assignee: WUHAN CHINA STAR OPTOELECTRONICS TECHNOLOGY CO., LTD., Wuhan, Hubei (CN)

(*) Notice: Subject to any disclaimer, the term of this patent is extended or adjusted under 35 U.S.C. 154(b) by 192 days.

(21) Appl. No.: 14/910,575

(22) PCT Filed: Jan. 19, 2016

(86) PCT No.: PCT/CN2016/071311
§ 371 (c)(1),
(2) Date: Feb. 5, 2016

(87) PCT Pub. No.: WO2017/107272
PCT Pub. Date: Jun. 29, 2017

(65) Prior Publication Data
US 2017/0255042 A1 Sep. 7, 2017

(30) Foreign Application Priority Data

Dec. 25, 2015 (CN) .......................... 2015 1 0999564

(51) Int. Cl.
G02F 1/13357 (2006.01)
G02F 1/133 (2006.01)
G02F 1/1335 (2006.01)

(52) U.S. Cl.
CPC ........ G02F 1/1336 (2013.01); G02F 1/13306 (2013.01); G02F 1/133502 (2013.01);
(Continued)

(58) Field of Classification Search
CPC ..... H01L 33/50; H01L 33/507; H01L 31/055; H01L 33/502; G02F 2001/133614; G02F 2001/133616; G02F 1/133528
See application file for complete search history.

(56) References Cited

U.S. PATENT DOCUMENTS 7,019,801 B2 3/2006 Ueki et al.
7,804,640 B1 9/2010 Bass et al.
(Continued)

FOREIGN PATENT DOCUMENTS

CN 1353325 6/2002
CN 104516149 4/2015
(Continued)

OTHER PUBLICATIONS

International Search Report for PCT/CN2016/071311, Completed by the Chinese Patent Office dated Aug. 5, 2016, 12 Pages.

Primary Examiner — Edmond C Lau
Assistant Examiner — Jonathan Y Jung
(74) Attorney, Agent, or Firm — Mintz Levin Cohn Ferris Glovsky and Popeo, P.C.; Steven M. Jensen

(57) ABSTRACT

A reflective liquid crystal panel including a first substrate and a second substrate disposed opposite to each other and a liquid crystal layer. A reflection layer is provided on the first substrate, and a polarizing plate is provided the second substrate. A unidirectional wavelength converting layer and a quantum dot thin film layer are sequentially laminated between the second substrate and the liquid crystal layer. The unidirectional wavelength conversion layer made of an up conversion material is used to convert the incident ambient light into a blue light or an ultraviolet light. The quantum dot thin film layer includes a plurality of light
(Continued)

emitting areas which are arranged in array and can be excited to emit light with different colors. A display device including the reflective liquid crystal panel as mentioned above is also disclosed.

18 Claims, 3 Drawing Sheets

(52) U.S. Cl.
CPC .. *G02F 1/133504* (2013.01); *G02F 1/133528* (2013.01); *G02F 1/133553* (2013.01); *G02F 1/133617* (2013.01); *G02F 2001/133507* (2013.01); *G02F 2001/133614* (2013.01); *G02F 2001/133616* (2013.01); *G02F 2001/133618* (2013.01); *G02F 2202/10* (2013.01); *G02F 2202/36* (2013.01); *G02F 2203/02* (2013.01)

(56) References Cited

U.S. PATENT DOCUMENTS

| | | | | |
|---|---|---|---|---|
| 2007/0297062 | A1* | 12/2007 | Park | G02B 3/0043 359/619 |
| 2008/0049165 | A1* | 2/2008 | Min | G02B 3/0043 349/64 |
| 2014/0347601 | A1* | 11/2014 | Gibson | G02B 26/005 349/62 |
| 2015/0338705 | A1 | 11/2015 | Itou | |
| 2016/0041429 | A1* | 2/2016 | Wang | G02F 1/133553 349/68 |
| 2016/0370656 | A1* | 12/2016 | Zhang | G02F 1/1335 |

FOREIGN PATENT DOCUMENTS

| | | |
|---|---|---|
| CN | 104950509 | 9/2015 |
| CN | 105093682 | 11/2015 |
| JP | 2015225114 | 12/2015 |

* cited by examiner

REFLECTIVE LIQUID CRYSTAL PANEL AND DISPLAY DEVICE

CROSS-REFERENCE TO RELATED APPLICATION

This application is the U.S. national phase of PCT Application No. PCT/CN2016/071311 filed on Jan. 19, 2016, which claims priority to CN Patent Application No. 201510999564.5 filed on Dec. 25, 2015, the disclosures of which are incorporated in their entirety by reference herein.

TECHNICAL FIELD

The present disclosure relates to technical field of liquid crystal display, more particularly, to a reflective liquid crystal panel, and also relates to a display device including the reflective liquid crystal panel.

BACKGROUND ART

Nowadays, the liquid crystal display (LCD) has become the mainstream product on market because of its excellent performance and mature technology. The liquid crystal panel is a key component in a liquid crystal display device. The liquid crystal panel is mainly composed of a color film substrate and an array substrate, and the liquid crystal is filled between the color film substrate and the array substrate to constitute a liquid crystal cell. The liquid crystal panel can be classified into a transmissive type, a reflective type and a transflective type (also known as a semi-transmissive/semi-reflection type) according to the type of light source. A transmissive liquid crystal panel mainly uses a backlight as the light source, and the backlight is provided behind the liquid crystal panel. The pixel electrodes on the array substrate are transparent electrodes and are used as a transmission area, which may facilitate light of the backlight to transmit through the liquid crystal layer to display an image. A reflective liquid crystal panel mainly uses a frontlight or a natural light as the light source, and the array substrate thereof uses metal or other reflection electrodes with materials having good reflection properties as a reflection area, which is suitable for reflecting the light of the frontlight or the natural light source. A transflective liquid crystal display panel can be regarded as a combination of the transmissive and reflective liquid crystal display panels, and the array substrate is provided with both a reflection area and a transmission area, which can use the backlight and the frontlight or an external light source at the same time for displaying an image.

The advantage of the reflective liquid crystal panel lies in its capability of using the external light source, and its relatively low power consumption. As shown in FIG. 1, the existing reflective liquid crystal panel includes an array substrate 1, a liquid crystal layer 2 and a color film substrate 3. The liquid crystal layer 2 is arranged between the color film substrate 3 and the array substrate 1, the color film substrate 3 is provided with a polarizing plate 4 thereon, and the array substrate 1 is provided with a reflection layer 5 thereon. Normally, the array substrate 1 is further provided with structures such as thin film transistors, pixel electrodes, gate lines, data lines, etc. (not shown in FIG. 1), and generally, the color film substrate 3 is further provided with structures such as a color photoresist, a black matrix, etc. (not shown in FIG. 1). The liquid crystal panel realizes display through the following procedures: first, an ambient light passes through the polarizing plate 4, the color film substrate 3 and the liquid crystal layer 2 to reach the reflection layer 5; and then the light is reflected by the reflection layer 5, and passes through the liquid crystal layer 2, the color film substrate 3 and the polarizing plate 4 again to achieve the purpose of display.

In the liquid crystal panel, the light loss in the color film substrate 3 is relatively large, and in the above display process, the ambient light should pass through the color film substrate 3 for two times. It can be understood that, only a small portion of the ambient light can pass through the color film substrate 3 for two times to realize the display, hence utilization rate of the ambient light is relatively low, causing insufficient brightness and relatively low contrast of the image displayed by the liquid crystal panel.

SUMMARY

In view of this, the object of the present disclosure is to provide a reflective liquid crystal panel which can improve the utilization rate of the ambient light, and can increase the brightness and contrast of the reflective liquid crystal panel.

In order to achieve the above purpose, the technical solution applied in the present disclosure is as follows.

A reflective liquid crystal panel comprises a first substrate and a second substrate disposed opposite to each other and a liquid crystal layer disposed between the first substrate and the second substrate. A reflection layer is provided on a side, which is close to the liquid crystal layer, of the first substrate, and a polarizing plate is provided on a side, which is away from the liquid crystal layer, of the second substrate, wherein in a direction from the second substrate towards the liquid crystal layer, a unidirectional wavelength converting layer and a quantum dot thin film layer are sequentially laminated between the second substrate and the liquid crystal layer, and wherein the unidirectional wavelength conversion layer made of an up conversion material is used to convert the incident ambient light into a blue light or an ultraviolet light so as to be provided to the quantum dot thin film layer; and the quantum dot thin film layer comprises a plurality of light emitting areas which are arranged in array and can be excited to emit lights having different colors, and each light emitting area corresponds to a sub pixel in the liquid crystal panel.

The quantum dot thin film layer array is provided with a first light emitting area, a second light emitting area and a third light emitting area. The first light emitting area emits a red light when being exited, which corresponds to a red sub-pixel in the liquid crystal panel; the second light emitting area emits a green light when being exited, which corresponds to a green sub-pixel in the liquid crystal panel; and the third light emitting area is configured to be penetrated by an incident light, which corresponds to the blue sub-pixel in the liquid crystal panel.

Different light emitting areas may be excited to emit lights of different colors by controlling a size or a material type of the quantum dot in the light emitting area.

The material of the quantum dot is a semiconductor material which is selected from at least one of CdS, CdSe, CdTe, ZnSe, InP and InAs.

The number of the unidirectional wavelength conversion layers is two or more.

The reflective liquid crystal panel further comprises a light extraction layer which is arranged on the polarizing plate. The light extraction layer comprises a transparent base body, and a micro structure layer having a light extraction function is provided on a side, which is away from the polarizing plate, of the transparent base body.

The micro structure layer having the light extracting function is provided with a micro prism, an optical grating or micro structures arranged in array and having a conical, a cylindrical and/or a spherical shape.

A material of the transparent base body is an organic material and/or an inorganic material.

The light extraction layer is also provided with an anti-reflection film thereon which is coated on the micro structure layer.

The present disclosure also provides a display device including the above-mentioned reflective liquid crystal panel and a driving module, and the driving module transmits driving signals to the reflective liquid crystal panel so that the reflective liquid crystal panel may display an image.

The reflective liquid crystal panel and display device provided in the embodiment of the present disclosure adopt the quantum dot thin film layer to replace the color film substrate in the prior art, thereby improving the transmittance of the panel, also, a unidirectional wavelength converting layer is used therein to convert the external ambient light into the blue light or ultraviolet light having a short wavelength, then the blue light or ultraviolet light having the short wavelength excites the quantum dot thin film layer to generate a red light and a blue light, thereby improving the utilization of the ambient light by the reflective liquid crystal panel. Further, in some preferred embodiments, the provided reflective liquid crystal panel is also provided with a light extraction layer, and the light extraction layer is provided with a micro structure having a light extraction function and coated with an anti-reflection film, which not only improves the incidence efficiency of the external ambient light, but also improves the light emitting efficiency of the light that is reflected within the liquid crystal panel, thereby further improving the utilization of the ambient light by the reflective liquid crystal panel, so that the brightness and contrast of the reflective liquid crystal panel can be increased.

DETAILED DESCRIPTION OF EXEMPLARY EMBODIMENTS

Figure 1:
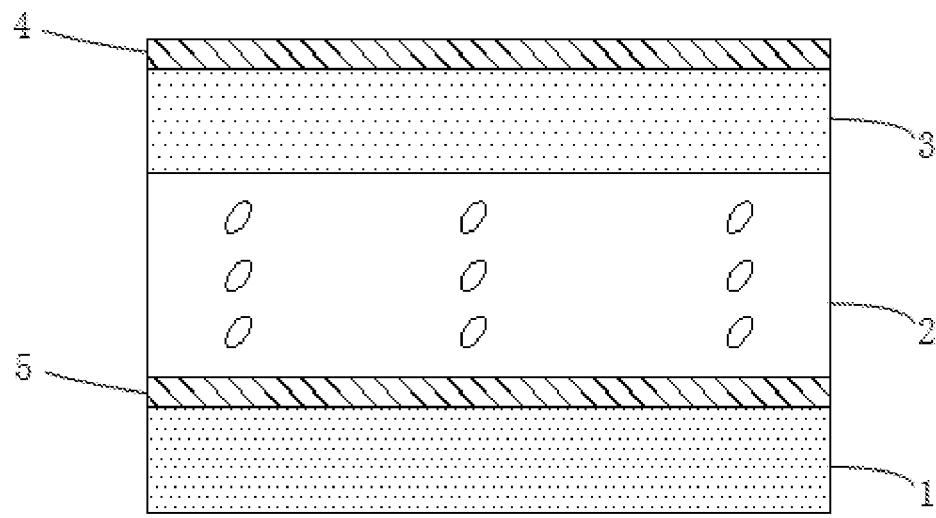
FIG. 1 is a structure diagram of an existing reflective liquid crystal panel.

In order for the purpose, technical solution and advantages of the present disclosure to be more clear and easy to be understood, detailed description on the embodiments of the present disclosure will be further conducted below in conjunction with the drawings. The preferred embodiments are exemplified in the drawings. The embodiments of the present disclosure as shown in the drawings and as described according to the drawings are only exemplified, and the present disclosure is not limited to these embodiments.

Here, it is also worthy to note that, in order to prevent the present disclosure from being obscured due to unnecessary details, the drawings only illustrate the structure and/or processing steps closely related to the technical solution of the present disclosure, while other details less related to the present disclosure are omitted.

Figure 2:
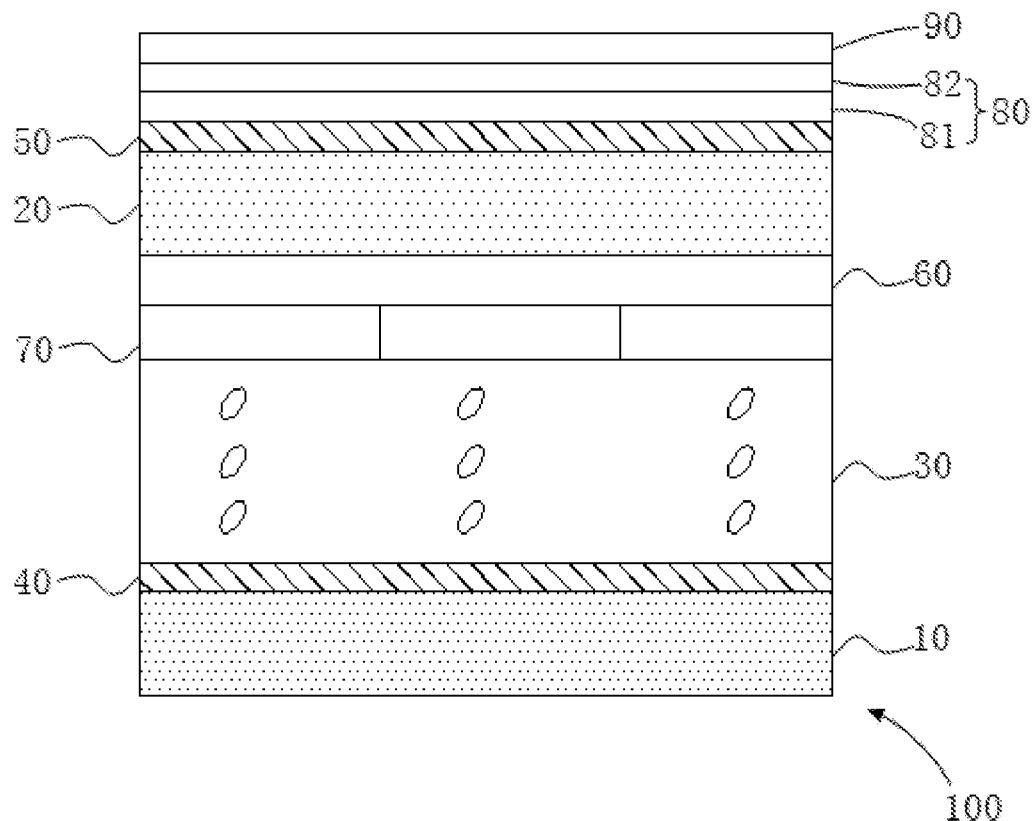
FIG. 2 is a structure diagram of a reflective liquid crystal panel provided by an embodiment of the present disclosure.

The present embodiment provides a reflective liquid crystal panel, as shown in FIG. 2, the reflective liquid crystal panel 100 includes a first substrate 10 and a second substrate 20 disposed opposite to each other and a liquid crystal layer 30 disposed between the first substrate 10 and the second substrate 20. A reflection layer 40 is provided on a side, which is close to the liquid crystal layer 30, of the first substrate 10, and a polarizing plate 50 is provided on a side, which is away from the liquid crystal layer 30, of the second substrate 20.

It is worthy to note that, the first substrate 10 is a thin film transistor array substrate, and the array substrate is generally provided with structures such as thin film transistors, pixel electrodes, gate lines, data lines, etc., and these structures can be provided in the solutions of the present disclosure with reference to the prior art, which will not be further described.

In the reflective liquid crystal panel 100 provided in the present embodiment, as shown in FIG. 2, in a direction from the second substrate 20 towards the liquid crystal layer 30, a unidirectional wavelength converting layer 60 and a quantum dot thin film layer 70 are sequentially laminated between the second substrate 20 and the liquid crystal layer 30.

Figure 3:
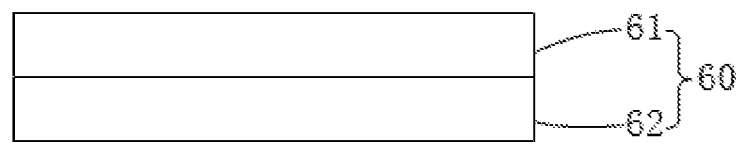
FIG. 3 is a structure diagram of a unidirectional wavelength converting layer provided in an embodiment of the present disclosure.

The unidirectional wavelength conversion layer 60 is made of an up conversion material which is used to convert the incident ambient light into a blue light or an ultraviolet light so as to be provided to the quantum dot thin film layer 70. The up conversion material has characteristics of converting the light with longer wavelength and lower energy into the light with shorter wavelength and higher energy. In this embodiment, the unidirectional wavelength conversion layer 60 mainly converts the incident ambient light to a blue light or an ultraviolet light with short wavelength. If the conversion to the light with the target wavelength cannot be achieved by using only one layer of the unidirectional wavelength conversion layer 60, multiple layers of the unidirectional wavelength converting layers 60 can be provided, such as the structure as shown in FIG. 3, the unidirectional wavelength converting layer 60 may include first conversion layer 61 and the second conversion layer 62 laminated with each other, and the multiple unidirectional wavelength converting layers 60 gradually convert the wavelength of the incident light into more short one, until a light with a target wavelength is acquired.

Figure 4:
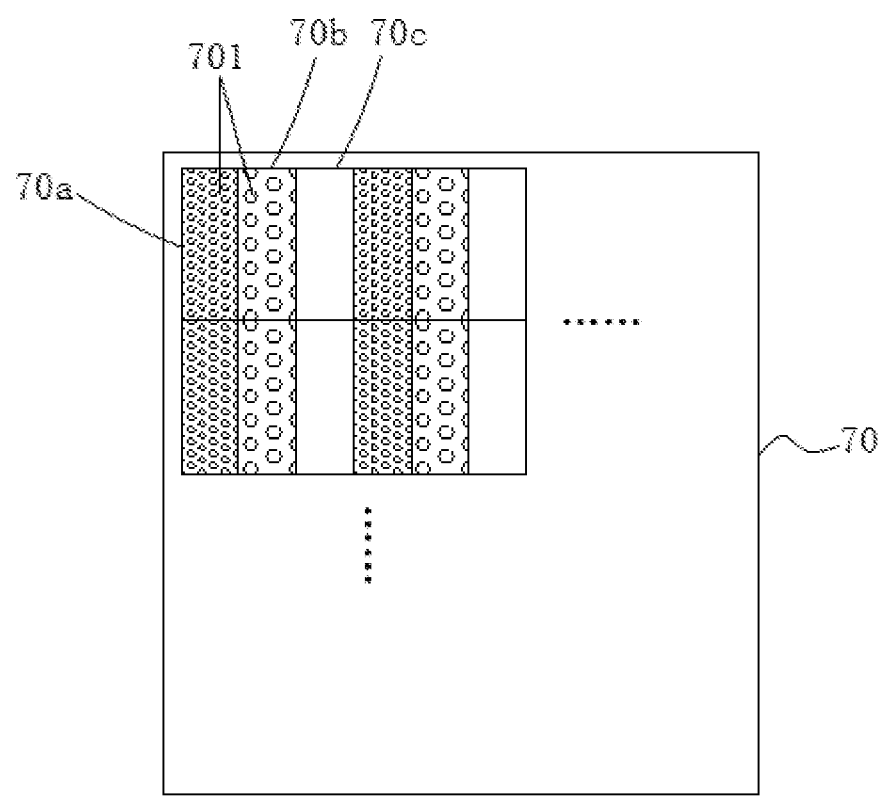
FIG. 4 is a structure diagram of a quantum dot thin film layer provided in an embodiment of the present disclosure.

Referring to FIG. 4, the quantum dot thin film layer 70 comprises a plurality of light emitting areas 70a, 70b and 70c which are arranged in array and can be excited to emit lights of different colors, and each of the light emitting areas 70a, 70b and 70c corresponds to a sub pixel in the liquid crystal panel.

Specifically, in the present embodiment, as shown in FIG. 4, the quantum dot thin film layer 70 array is provided with a first light emitting area 70a, a second light emitting area 70b and a third light emitting area 70c. The first light emitting area 70a emits a red light when being exited, which corresponds to a red sub-pixel in the liquid crystal panel, the second light emitting area 70b emits a green light when being exited, which corresponds to a green sub-pixel in the liquid crystal panel, and the third light emitting area 70c is configured to be penetrated by an incident light, which corresponds to the blue sub-pixel in the liquid crystal panel. Regarding the first light emitting region 70a, after the blue light or the ultraviolet light formed through the conversion by the unidirectional wavelength converting layer 60 is incident to the first light emitting area 70a, the first light emitting area 70a is excited to emit the red light. Then, the red light passes through the liquid crystal layer 30 to reach the reflection layer 40 so as to be reflected, and the reflected red light is incident to the first light emitting area 70a again and is emitted to the external environment, wherein a part of light with short wavelength doped in the red light may excite the first light emitting area 70a again to emit more red light. The process of the second light emitting area 70b being excited to emit the green light is similar to the first light emitting area 70a. Regarding the third light emitting area 70c, after the blue light or the ultraviolet light formed through the conversion by the unidirectional wavelength converting layer 60 is incident to the third light emitting area 70c, the blue light or the ultraviolet light penetrates the third light emitting area 70c, and does not excite any light having other colors. The blue light or the ultraviolet light passes through the third light emitting area 70c again after being reflected by the reflection layer 40, and is emitted to the external environment.

By controlling the liquid crystal deflection in the liquid crystal layer 30 corresponding to the respective first, second and third light emitting areas 70a, 70b and 70c by thin film transistors arranged in the first substrate 10, the components of light in the first, second and third light emitting areas 70a, 70b and 70c, which can pass through the polarizing plate 50 after being reflected, can be controlled, thereby achieving the image display of the reflective liquid crystal panel 100.

The reflective liquid crystal panel provided above adopts the quantum dot thin film layer to replace the color film substrate in the prior art, which improves the transmittance of the panel, and a unidirectional wavelength converting layer is used therein to convert the external ambient light into the blue light or ultraviolet light having a short wavelength, then the blue light or ultraviolet light having the short wavelength excites the quantum dot thin film layer to generate a red light and a blue light, thereby improving the utilization of the ambient light used by the reflective liquid crystal panel.

Referring to FIG. 4, by controlling the size or the material type of the quantum dot 701 in the light emitting areas 70a, 70b and 70c, different light emitting areas 70a, 70b and 70c may be excited to emit light with different colors. Specifically speaking, as shown in FIG. 4, the quantum dots 701 having different sizes are provided respectively in the first light emitting area 70a and the second light emitting area 70b, so that the first light emitting area 70a and the second light emitting area 70b may be excited respectively to emit red light and green light, while the third light emitting area 70c is not provided with the quantum dot 701, hence the incidence of the blue light or ultraviolet light into the third light emitting area 70c does not excite any light with other colors. Specifically speaking, the material of the quantum dot 701 is a semiconductor material which is selected from at least one of CdS, CdSe, CdTe, ZnSe, InP and InAs.

Figure 5:
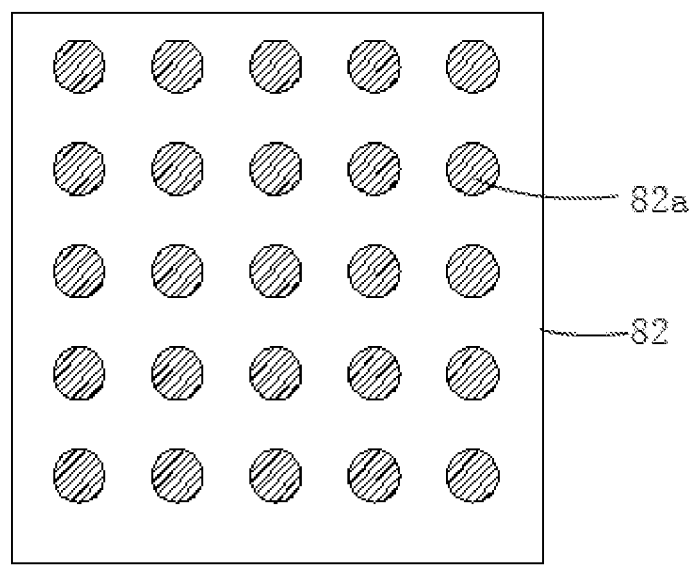
FIG. 5 is a structure diagram of a micro structure layer provided in an embodiment of the present disclosure.

In order to further improve the utilization of the ambient light, as shown in FIG. 2, the reflective liquid crystal panel 100 provided by the present embodiment further comprises a light extraction layer 80 which is arranged on the polarizing plate 50. The light extraction layer 50 comprises a transparent base body 81, and a micro structure layer 82 having a light extraction function is provided on a side, which is away from the polarizing plate 50, of the transparent base body 81. Specifically speaking, a material of the transparent base body 81 can be an organic material (such as an organic small molecular material like the amine derivate) and/or an inorganic material (such as zinc selenide and so on). As shown in FIG. 5, the micro structure layer 82 having the light extracting function is provided with a micro prism, an optical grating or micro structures 82a arranged in array and having a conical, a cylindrical and/or a spherical shape. Furthermore, in the present embodiment, as shown in FIG. 2, the light extraction layer 80 is also provided with an anti-reflection film 90 thereon, and the anti-reflection film 90 is coated on the micro structure layer 82. Since the light extraction layer 80 is provided with a micro structure 82a having a light extraction function and coated with an anti-reflection film 90, it may not only improve the incidence efficiency of the external ambient light, but also improve the light emitting efficiency of the light that is reflected within the liquid crystal panel, thereby further improving the utilization of the ambient light by the reflective liquid crystal panel, so that the display brightness and contrast of the reflective liquid crystal panel can be increased.

Figure 6:
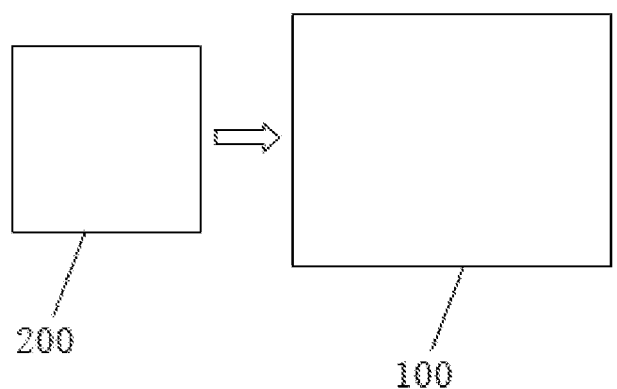
FIG. 6 is a structure diagram of a display device provided by an embodiment of the present disclosure.

As shown in FIG. 6, the embodiment of the present disclosure also provides a display device comprising a reflective liquid crystal panel 100 and a drive module 200 provided above in present embodiment, wherein the driving module 200 is used to drive signals to the reflective liquid crystal panel 100 so that the reflective liquid crystal panel 100 may display an image. The display device of the present disclosure uses ambient light to display, thereby lowering the power consumption and increasing the utilization of the ambient light, so that the display quality is improved.

It should be explained that the relationship terms, such as first and second, etc., in the present application are only used for distinguishing one entity or operation from another entity or operation without requiring or implying any actual relation or sequence existing between these entities or operations. Moreover, the term "include", "contain" or any other variant means covering instead of exclusively including, so that the process, method, object or device including a series of factors not only includes those factors, but also includes other factors that are not explicitly listed, or further include inherent factors for this process, method, object or device. In a case of no more limitations being provided, the factors defined by the expression "include one . . . " do not exclude additional identical factors existing in the process, method, object or device which includes the factors.

The above statements are only the specific embodiments of the present application. It should be pointed out that improvements and modification can be made by those ordinary skilled in the art without breaking away from the principle of the present application, also those improvements and modification should be considered as the protection scope of the present application.

What is claimed:

1. A reflective liquid crystal panel comprising a first substrate and a second substrate disposed opposite to each other and a liquid crystal layer disposed between the first substrate and the second substrate, a reflection layer being provided on a side, which is close to the liquid crystal layer, of the first substrate, and a polarizing plate being provided on a side, which is away from the liquid crystal layer, of the second substrate, wherein, in a direction from the second substrate to the liquid crystal layer, a wavelength converting layer and a quantum dot thin film layer are sequentially laminated between the second substrate and the liquid crystal layer, wherein the first substrate, the reflection layer, the liquid crystal layer, the quantum dot thin film layer, the wavelength converting layer, and the second substrate are stacked in order, wherein the wavelength converting layer is made of an up conversion material and is used to convert the incident ambient light into a blue light or an ultraviolet light so as to be provided to the quantum dot thin film layer, wherein the quantum dot thin film layer comprises a plurality of light emitting areas which are arranged in array and can be excited to emit lights of different colors, and each of the light emitting areas corresponds to a sub pixel in the liquid crystal panel, and wherein the wavelength converting layer includes two or more layers of the up conversion material laminated with each other to gradually convert wavelength of the incident ambient light.

2. The reflective liquid crystal panel of claim 1, wherein the quantum dot thin film layer array is provided with a first light emitting area, a second light emitting area and a third light emitting area; and the first light emitting area emits a red light when being exited, which corresponds to a red sub-pixel in the liquid crystal panel, the second light emitting area emits a green light when being exited, which corresponds to a green sub-pixel in the liquid crystal panel, and the third light emitting area is configured to be penetrated by an incident light, which corresponds to the blue sub-pixel in the liquid crystal panel.

3. The reflective liquid crystal panel of claim 1, wherein different light emitting areas may be excited to emit light with different colors by controlling a size or a material type of the quantum dot in the light emitting area.

4. The reflective liquid crystal panel of claim 3, wherein the material of the quantum dot is a semiconductor material which is selected from at least one of CdS, CdSe, CdTe, ZnSe, InP and InAs.

5. The reflective liquid crystal panel of claim 1, wherein the reflective liquid crystal panel further comprises a light extraction layer, which is arranged on the polarizing plate and comprises a transparent base body, and a micro structure layer having a light extraction function is provided on a side, which is away from the polarizing plate, of the transparent base body.

6. The reflective liquid crystal panel of claim 2, wherein the reflective liquid crystal panel further comprises a light extraction layer, which is arranged on the polarizing plate and comprises a transparent base body, and a micro structure layer having a light extraction function is provided on a side, which is away from the polarizing plate, of the transparent base body.

7. The reflective liquid crystal panel of claim 6, wherein the micro structure layer having the light extracting function is provided with a micro prism, an optical grating or micro structures arranged in array and having a conical, a cylindrical and/or a spherical shape.

8. The reflective liquid crystal panel of claim 6, wherein a material of the transparent base body is an organic material and/or an inorganic material.

9. The reflective liquid crystal panel of claim 6, wherein an anti-reflection film coated on the micro structure layer is further provided on the light extraction layer.

10. A display device comprising a reflective liquid crystal panel and a driving module which drives signals to the reflective liquid crystal panel so that the reflective liquid crystal panel displays an image, wherein the reflective liquid crystal panel comprising a first substrate and a second substrate disposed opposite to each other and a liquid crystal layer disposed between the first substrate and the second substrate, a reflection layer being provided on a side, which is close to the liquid crystal layer, of the first substrate, and a polarizing plate being provided on a side, which is away from the liquid crystal layer, of the second substrate, wherein, in a direction from the second substrate to the liquid crystal layer, a wavelength converting layer and a quantum dot thin film layer are sequentially laminated between the second substrate and the liquid crystal layer, wherein the first substrate, the reflection layer, the liquid crystal layer, the quantum dot thin film layer, the wavelength converting layer, and the second substrate are stacked in order, wherein the wavelength converting layer is made of an up conversion material and is used to convert the incident ambient light into a blue light or an ultraviolet light so as to be provided to the quantum dot thin film layer, wherein the quantum dot thin film layer comprises a plurality of light emitting areas which are arranged in array and can be excited to emit lights of different colors, and each of the light emitting areas corresponds to a sub pixel in the liquid crystal panel, and wherein the wavelength converting layer includes two or more layers of the up conversion material laminated with each other to gradually convert wavelength of the incident ambient light through each layer.

11. The display device of claim 10, wherein the quantum dot thin film layer array is provided with a first light emitting area, a second light emitting area and a third light emitting area; and the first light emitting area emits a red light when being exited, which corresponds to a red sub-pixel in the liquid crystal panel, the second light emitting area emits a green light when being exited, which corresponds to a green sub-pixel in the liquid crystal panel, and the third light emitting area is configured to be penetrated by an incident light, which corresponds to the blue sub-pixel in the liquid crystal panel.

12. The display device of claim 10, wherein different light emitting areas may be excited to emit light with different colors by controlling a size or a material type of the quantum dot in the light emitting area.

13. The display device of claim 12, wherein the material of the quantum dot is a semiconductor material which is selected from at least one of CdS, CdSe, CdTe, ZnSe, InP and InAs.

14. The display device of claim 10, wherein the reflective liquid crystal panel further comprises a light extraction layer which is arranged on the polarizing plate and comprises a transparent base body, and a micro structure layer having a light extraction function is provided on a side, which is away from the polarizing plate, of the transparent base body.

15. The display device of claim 11, wherein the reflective liquid crystal panel further comprises a light extraction layer which is arranged on the polarizing plate and comprises a transparent base body, and a micro structure layer having a light extraction function is provided on a side, which is away from the polarizing plate, of the transparent base body.

16. The display device of claim 15, wherein the micro structure layer having the light extracting function is provided with a micro prism, a grating or micro structures arranged in array and having a conical, a cylindrical and/or a spherical shape.

17. The display device of claim 15, wherein a material of the transparent base body is an organic material and/or an inorganic material.

18. The display device of claim 15, wherein an anti-reflection film coated on the micro structure layer is further provided on the light extraction layer.

\* \* \* \* \*